United States Patent
Hwang et al.

(10) Patent No.: US 8,504,053 B2
(45) Date of Patent: Aug. 6, 2013

(54) APPARATUS AND METHOD FOR TRANSMITTING AND RECEIVING DATA IN A COMMUNICATION SYSTEM

(75) Inventors: Sung-Soo Hwang, Yongin-si (KR); Jin-Ghoo Choi, Seoul (KR); Sang-Boh Yun, Seongnam-si (KR); Seung-Hee Han, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 583 days.

(21) Appl. No.: 12/380,959

(22) Filed: Mar. 5, 2009

(65) Prior Publication Data
US 2009/0227264 A1    Sep. 10, 2009

(30) Foreign Application Priority Data
Mar. 5, 2008   (KR) ................. 10-2008-0020746

(51) Int. Cl.
*H04W 72/00*   (2009.01)
(52) U.S. Cl.
USPC ............ 455/452.2; 455/453; 455/7; 455/11.1

(58) Field of Classification Search
USPC .......................... 455/7, 11.1, 452.2
See application file for complete search history.

(56) References Cited

U.S. PATENT DOCUMENTS

| | | | |
|---|---|---|---|
| 7,725,074 B2 * | 5/2010 | Nishio et al. ................. | 455/7 |
| 7,889,632 B2 * | 2/2011 | Hamamoto et al. .......... | 370/203 |
| 2007/0081603 A1 * | 4/2007 | Jang et al. ................... | 375/260 |
| 2008/0070510 A1 * | 3/2008 | Doppler et al. .............. | 455/69 |
| 2008/0198906 A1 * | 8/2008 | Kim et al. .................... | 375/211 |

FOREIGN PATENT DOCUMENTS
WO   WO 2006088105 A1 *   8/2006

* cited by examiner

*Primary Examiner* — Jean Gelin
*Assistant Examiner* — Qun Shen

(57) ABSTRACT

An apparatus and method for receiving data in a communication system. A Mobile Station (MS) receives a Base Station (BS) signal and a Relay Station (RS) signal, measures strengths of the received BS signal and RS signal, determines whether the BS signal acts as interference to the RS signal depending on the measured strengths of the RS signal and the BS signal, and transmits the determination result to an RS in communication with the MS. The RS allocates resources using resource allocation information for the BS signal that acts as interference, and the MS receives data using the resource allocation scheme allocated from the RS.

18 Claims, 5 Drawing Sheets

APPARATUS AND METHOD FOR TRANSMITTING AND RECEIVING DATA IN A COMMUNICATION SYSTEM

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Mar. 5, 2008 and assigned Serial No. 10-2008-0020746, the disclosures of which are incorporated herein by reference.

TECHNICAL FIELD OF THE INVENTION

The present invention relates to an apparatus and method for transmitting and receiving data in a communication system.

BACKGROUND OF THE INVENTION

In communication systems, signaling transmission/reception is generally achieved between a fixed Base Station (BS) and a Mobile Station (MS) through a deep link (also referenced as a "hot link"), so a high-reliability radio communication link can be easily formed between the BS and the MS.

Presently, active research is being conducted to secure mobility of MSs and flexibility of wireless network configuration in the communication system and to provide more efficient services in the wireless environment where there is a significant change in the traffic distribution and the required amount of traffic. As one of the methods suggested by the research, a communication system can be considered, to which a data transfer scheme based on a multi-hop relay technology is applied using Relay Stations (RSs).

A communication system using the relay scheme (hereinafter referred to as a 'relay communication system') can reconfigure its network to rapidly cope with a change in the communication environment, and can efficiently operate the entire wireless network.

In addition, the relay communication system can expand its cell service coverage and increase the system capacity. For example, when a channel state between a BS and an MS is poor, an RS can be installed in a region where the channel state is poor, to form a relay path through the RS, thereby providing a wireless channel having a better channel state to the MS. Further, the relay scheme can be used in the cell boundary where the channel state to the BS is poor, to provide higher-rate data channels and expand the cell service coverage.

With reference to FIG. 1, a description will now be made of data transmission/reception periods in a relay communication system using a half-duplex scheme (hereinafter referred to as a 'half-duplex relay communication system').

FIG. 1 is a diagram illustrating data transmission/reception periods in a general half-duplex relay communication system.

As illustrated, FIG. 1 shows data transmission/reception periods for downlink data transmission/reception between a BS, an RS and an MS in a half-duplex relay communication system. In FIG. 1, solid lines represent transmission periods, while dotted lines represent reception periods.

The BS transmits first data S1 in a first time period t1, and transmits no data in a second time period t2.

The RS receives the first data transmitted by the BS in the first time period, and transmits second data S1' generated using the first data to the MS in the second time period.

The MS can receive the first data transmitted by the BS in the first time period and can receive the second data transmitted by the RS in the second time period according to its location.

Resources of the half-duplex relay communication system can be defined as time. That is, in the first time period, the BS transmits the first data to the RS, and in the second time period, the RS transmits the second data generated using the first data to the MS.

In this case, the RS performs only one of data transmission and data reception in one time period, causing a reduction in resource-use efficiency for data transmission/reception. In order to address these problems, a relay communication system using a full-duplex scheme (hereinafter referred to as a 'full-duplex relay communication system') has been proposed to more efficiently use resources, and a frame structure in the full-duplex relay communication system is shown in FIG. 2.

FIG. 2 is a diagram illustrating data transmission/reception periods in a general full-duplex relay communication system.

As illustrated, FIG. 2 shows data transmission/reception periods for downlink data transmission/reception between a BS, an RS and an MS in a full-duplex relay communication system. In FIG. 2, solid lines represent transmission periods, while dotted lines represent reception periods.

The BS transmits first data S1 in a first time period t1, and transmits third data S2 in a second time period t2.

The RS receives the first data transmitted by the BS in the first time period, and transmits second data S1' generated using the first data to the MS in the second time period. Further, the RS receives the third data transmitted by the BS in the second time period.

The MS, according to its location, can receive the first data transmitted by the BS in the first time period and receive the second data transmitted by the RS and the third data transmitted by the BS in the second time period. In other words, the full-duplex RS can simultaneously transmit and receive data.

With reference to FIG. 3, a description will now be made of a configuration of a general relay communication system.

FIG. 3 is a diagram illustrating a configuration of a general relay communication system.

Referring to FIG. 3, a relay communication system includes a BS 310, an RS 350, a first MS 351, and a second MS 353. Service coverage of the relay communication system can be indicated by coverage of a BS cell (BS's cell) 320 managed by the BS 310 and coverage of an RS cell (RS's cell) 360 managed by the RS 350. In addition, signals 'a', 'b' and 'c' transmitted by the BS 310 are shown. The signals 'a', 'b' and 'c' are transmitted simultaneously by the BS 310. The RS 350 receives the signal 'b' transmitted by the BS 310.

In addition, signals 'x' and 'y' transmitted by the RS 350 are shown in FIG. 3. The signals 'x' and 'y' are transmitted simultaneously by the RS 350. The RS 350 transmits the signal 'x' to the first MS 351 and the signal 'y' to the second MS 353.

Meanwhile, the first MS 351 is assumed to be included in the BS cell 320 or located in its adjacent region, and the second MS 353 is assumed to be located far enough from the BS cell 320 or located out of the service coverage 320 of the BS 310.

The second MS 353 receives the signal 'c' from the BS 310 while receiving the signal 'y' from the RS 350. In this case, the second MS 353 can receive the signal 'y' without interference caused by the signal 'c' transmitted by the BS 310, since the signal 'c' is lower in strength than the signal 'y'.

In the general half-duplex relay communication system, the transmission time of the BS 310 is separated from the transmission time of the RS 350 as shown in FIG. 1, so the signals 'a' and 'c' do not interfere with each other. However, in the full-duplex relay communication system, since the first MS 351 receives the signal 'a' from the BS 310 while receiving the signal 'x' from the RS 350, the signal 'a' may act as interference to the signal 'x' in the first MS 351.

As described above, in the conventional full-duplex relay communication system, when an MS in communication with an RS is located in a place near the cell of a BS, the BS's signal may act as an interference signal for the MS.

SUMMARY OF THE INVENTION

To address the above-discussed deficiencies of the prior art, it is a primary object to address at least the problems and/or disadvantages and to provide at least the advantages described below. Accordingly, an aspect of the present invention provides an apparatus and method for transmitting and receiving data in a relay communication system.

Another aspect of the present invention provides a data transmission/reception apparatus and method for reducing an effect caused by an interference signal from a BS in a relay communication system.

According to one aspect of an exemplary embodiment of the present invention, there is provided a method for receiving data by a MS in a communication system, in which a BS signal and a RS signal are received, strengths of the received BS signal and RS signal are measured, whether the BS signal acts as interference to the RS signal is determined depending on the measured strengths of the RS signal and the BS signal, the determination result is transmitted to an RS in communication with the MS, and when a resource allocation scheme is received from the RS, data is received using the received resource allocation scheme.

According to another aspect of an exemplary embodiment of the present invention, there is provided a method for transmitting data by a RS in a communication system, in which information as to whether a BS signal acts as interference to an RS signal is received from a MS, data is transmitted to the MS using an existing resource allocation scheme, when the information indicates that the BS signal does not act as interference to the RS signal, a resource allocation scheme used for data transmitted by the BS is detected when the information indicates that the BS signal acts as interference to the RS signal, and data is transmitted to the MS using the detected resource allocation scheme.

According to still another aspect of an exemplary embodiment of the present invention, there is provided an apparatus for receiving data in a communication system, in which a MS receives a BS signal and a RS signal, measures strengths of the received BS signal and RS signal, determines whether the BS signal acts as interference to the RS signal depending on the measured strengths of the RS signal and the BS signal, transmits the determination result to an RS in communication with the MS, and receives data using a resource allocation scheme received from the RS.

According to yet another aspect of an exemplary embodiment of the present invention, there is provided an apparatus for receiving data in an apparatus for transmitting data in a communication system, in which a RS receives, from a MS, information as to whether a BS signal acts as interference to an RS signal, transmits data to the MS using an existing resource allocation scheme when the information indicates that the BS signal does not act as interference to the RS signal, detects a resource allocation scheme used for data transmitted by the BS when the information indicates that the BS signal acts as interference to the RS signal, and transmits data to the MS using the detected resource allocation scheme.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides an apparatus and method for transmitting and receiving signals in a relay communication system with RSs. The present invention relates to a communication system using a multi-hop relay scheme (hereinafter referred to as a 'multi-hop relay communication system'), and in particular, to a method and apparatus for checking and using interference between a BS and an RS when an MS is located in the cell boundary between the BS and the RS in a multi-hop relay communication system using a full-duplex relay scheme. In particular, the present invention provides an apparatus and method for transmitting and receiving signals after removing interference when an MS in communication with an RS is located in a place near a BS cell or located in the BS cell.

With reference to the annexed drawings, a description will now be made of an apparatus and method for transmitting and receiving data in a communication system according to an embodiment of the present invention.

Figure 1:
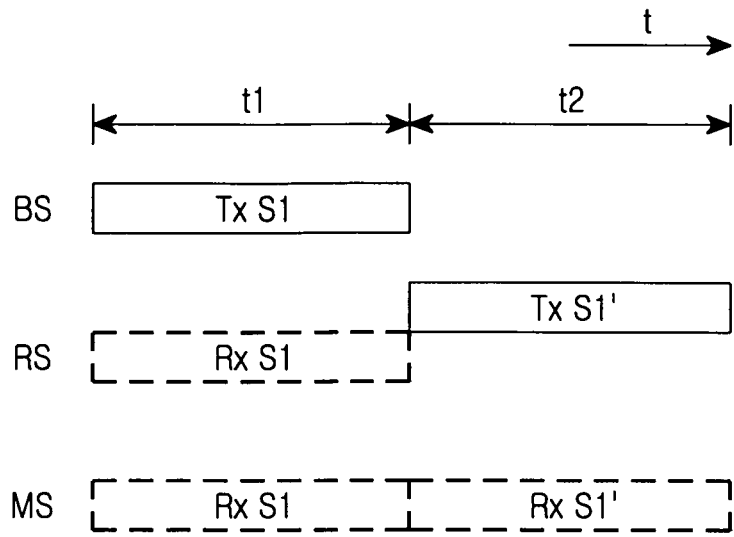
FIG. 1 illustrates data transmission/reception periods in a general half-duplex relay communication system.
Figure 2:
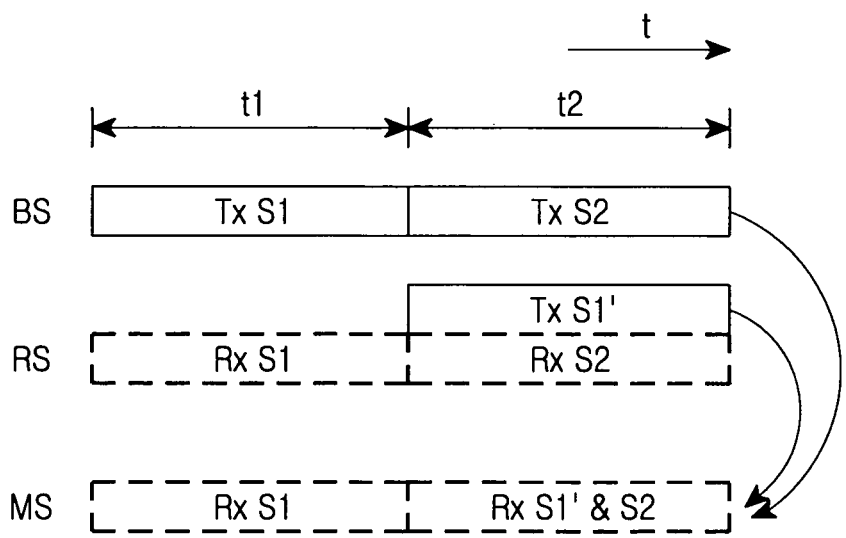
FIG. 2 illustrates data transmission/reception periods in a general full-duplex relay communication system.
Figure 3:
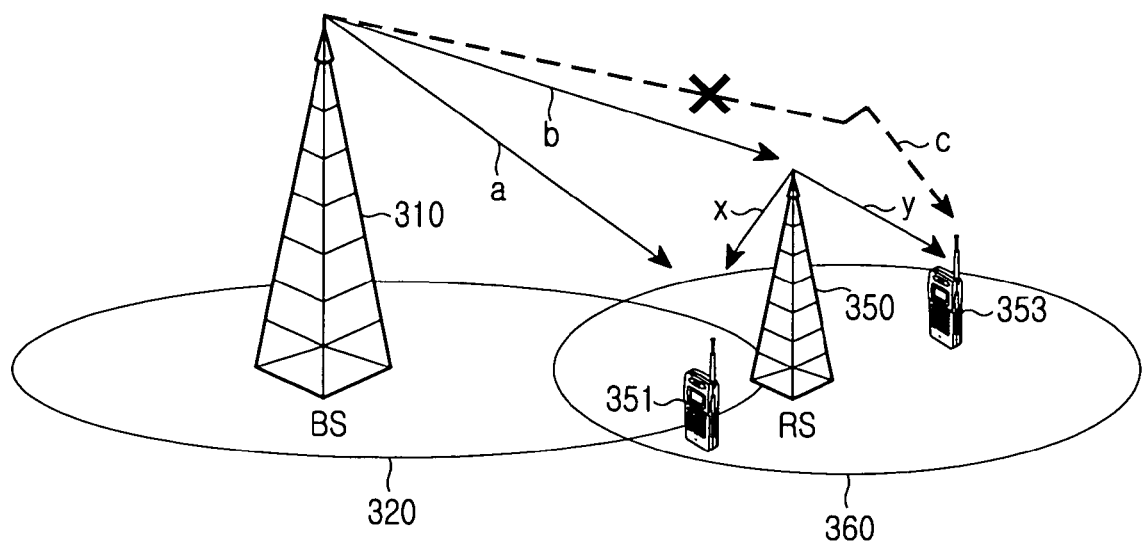
FIG. 3 illustrates a configuration of a general relay communication system.
Figure 4:
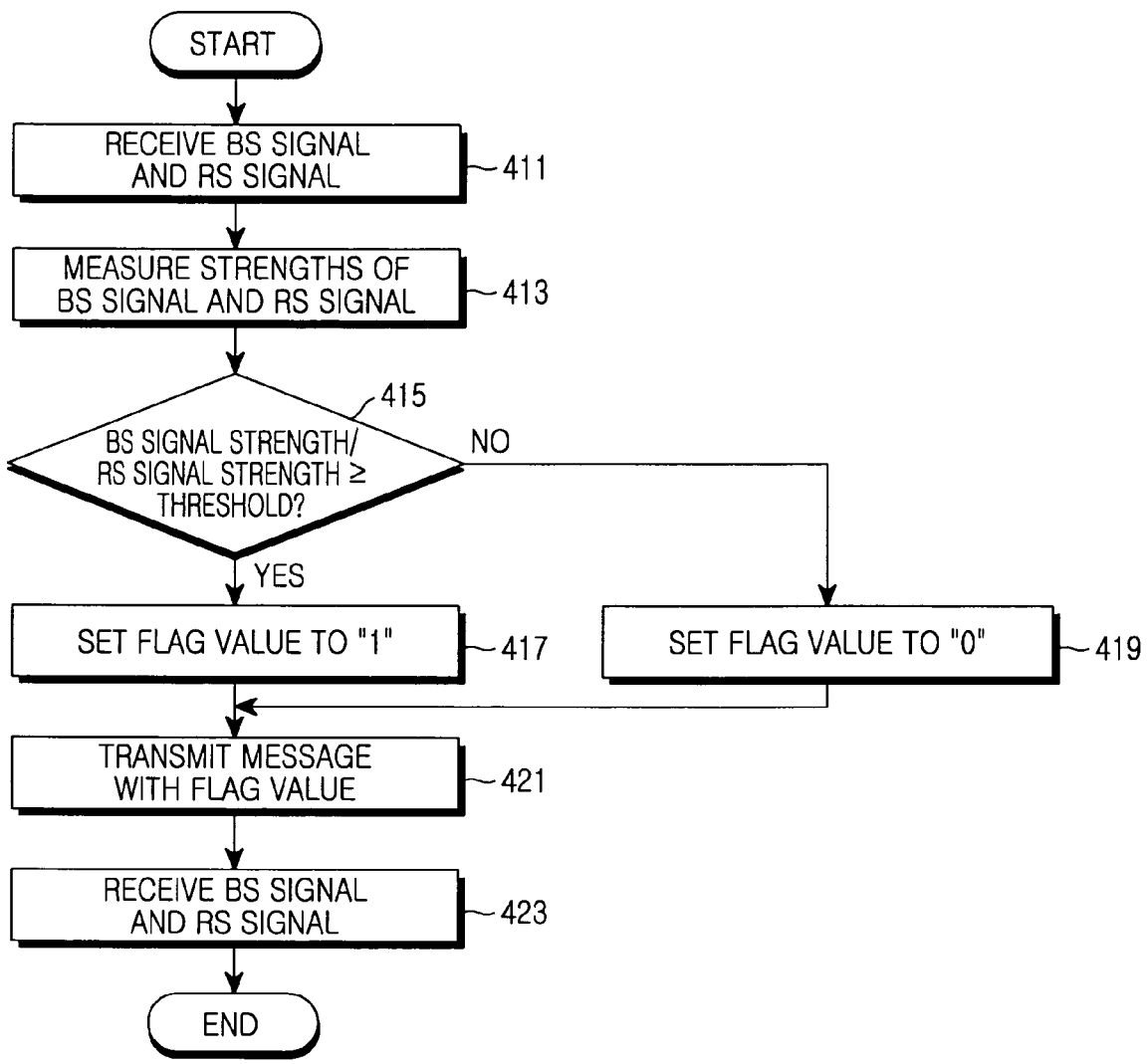
FIG. 4 illustrates a flowchart for an MS's operation in a relay communication system according to an embodiment of the present invention.

FIG. 4 illustrates a flowchart for an MS's operation in a relay communication system according to an embodiment of the present invention.

Referring to FIG. 4, an MS receives a BS signal (signal from a BS) and an RS signal (signal from an RS) in step 411. It is assumed that the MS is communicating with the RS.

In step 413, the MS measures strengths of the BS signal and the RS signal. The MS can measure the RS signal strength and the BS signal strength using Signal to Interference and Noise Ratio (SINR), Carrier to Interference and Noise Ratio (CINR), signal power, etc.

In step 415, the MS compares a ratio of RS's signal strength to BS's signal strength (='BS signal strength'/'RS signal strength') with a threshold. The threshold can be predetermined, notified to the MS by the RS, or decided by the MS itself. Otherwise, although not illustrated, when the MS transmits, to the RS, information including at least one of a ratio of RS's signal strength to BS's signal strength, a signal-to-interference ratio, data throughput, Channel Quality Information (CQI) and channel capacity, the RS can compare the information received from the MS with a threshold. Since the MS is communicating with the RS, the RS's signal strength may be higher than the BS's signal strength in step 415. However, the comparison procedure is performed by the MS to apply its result when such performance as a signal-to-interference ratio is reduced due to the interference from the BS.

When the ratio of RS's signal strength to BS's signal strength is greater than or equal to the threshold in step 415, the MS proceeds to step 417. The reason why the MS performs the comparison process in step 415 is to determine whether the BS signal acts as interference to the RS signal.

In step 417, the MS sets a preset particular flag value to '1'. When the ratio of RS's signal strength to BS's signal strength is less than the threshold in step 415, the MS proceeds to step 419.

In step 419, the MS sets a preset particular flag value to '0'. In step 421, the MS transmits a message including the flag value to the RS in communication with the MS.

In step 423, the MS receives both BS data and RS data. When the BS and the RS use the same resource allocation scheme (e.g. same modulation scheme, same coding scheme, same data allocation resource region information, etc.), the MS can simply perform a reception process only with resource allocation information from the RS without receiving resource allocation information of the BS. For example, when the MS has a Multiple Input Multiple Output (MIMO) reception function, it can perform MIMO reception using only resource allocation information of the RS without the need to detect resource allocation information of the BS.

The data allocation resource region information indicates, for example, data recovery information (sizes of data bursts, locations of data bursts, etc.) included in MAP.

The MS can receive only the RS data after removing the BS data, considering the BS data simultaneously received together with the RS data as an interference signal. Further, if the BS signal now acting as interference is a signal delivered to the MS via the RS, the RS stores the interference signal of the BS after its recovery and transmits it to the MS, and then the MS can combine it with a signal, which is received from the RS at the next point of time.

The MS's comparing the BS signal strength with the RS signal strength is described herein by way of example. Also, the MS can determine whether a BS signal strength/RS signal strength (BS/RS) value or a RS signal strength/BS signal strength (RS/BS) value is greater than or equal to the threshold, and set a flag value to '1' (indicating that the BS signal acts as interference) or '0' (indicating that the BS signal does not act as interference). In other words, the MS can determine whether the ratio of BS signal strength to RS signal strength exceeds the threshold, and set the flag value according thereto. As further another example, in an alternative exemplary method, the MS, without the flag, can report to the RS at least one of its measured interference from the BS, a signal-to-interference ratio, data throughput, CQI, and channel capacity so that the RS can determine presence/absence of the interference.

The MS can be an MS capable of transmitting and receiving MIMO signals.

Figure 5:
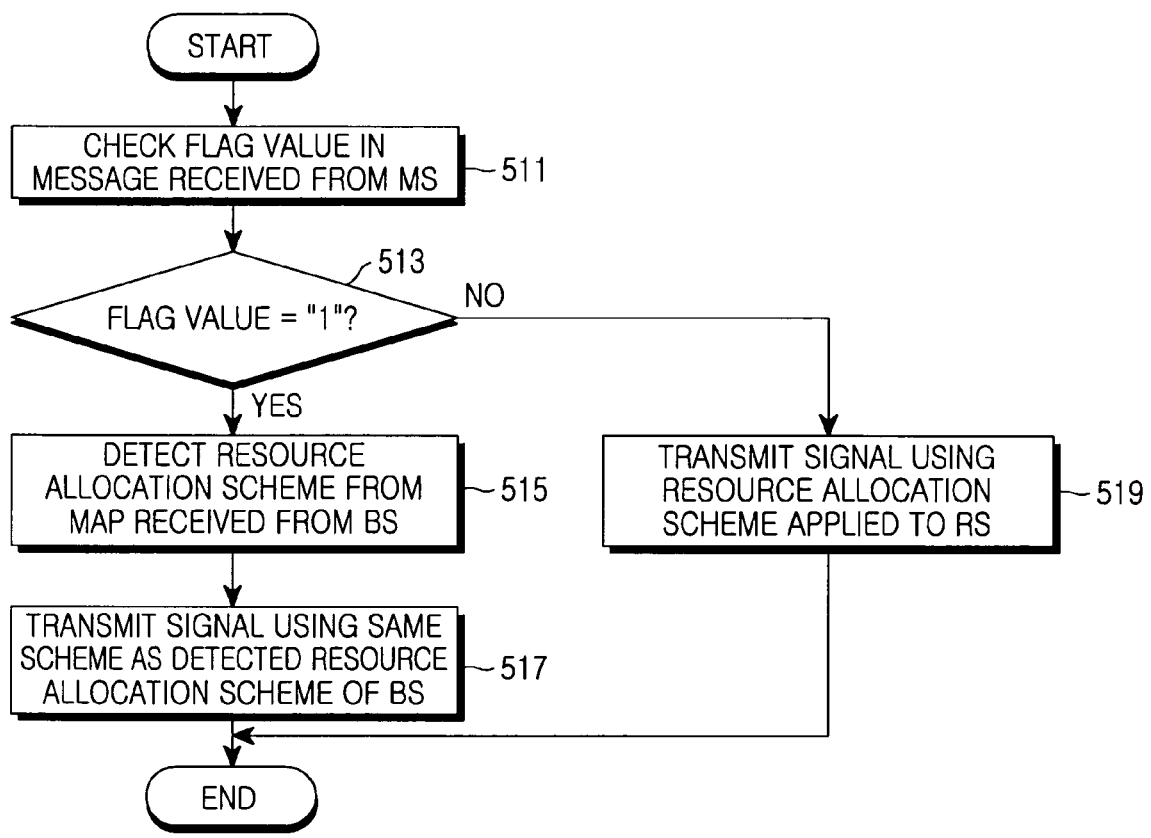
FIG. 5 illustrates a flowchart for an RS's operation in a relay communication system according to an embodiment of the present invention.

FIG. 5 illustrates a flowchart for an RS's operation in a relay communication system according to an embodiment of the present invention.

As illustrated, an RS checks a flag value included in a message received from an MS in step 511. The RS receives a message with a particular flag value from the MS and checks the flag value included in the received message. The MS is communicating with the RS. The RS allocates resources to the MS using a preset resource allocation scheme and communicates with the MS through the allocated resources. When there is no flag value in the message received from the MS, i.e. when information including interference, a signal-to-interference ratio, data throughput, CQI and channel capacity is received from the MS, the RS can compare the received information with a threshold and allocate resources according to the comparison result.

When a flag value in the message received from the MS is checked in step 511, the RS determines in step 513 whether the flag value is '1'. When it is determined that the flag value is '1', the RS proceeds to step 515.

In step 515, the RS detects a resource allocation scheme from the BS. For instance, the RS can detect a resource allocation scheme from MAP received from the BS.

In step 517, the RS transmits data using the same resource allocation scheme as the detected resource allocation scheme of the BS. When the RS and the BS use the same resource allocation scheme (e.g. same modulation scheme, same coding scheme, same data allocation resource region information, etc.), the MS can simply perform a reception process only with resource allocation information from the RS without receiving resource allocation information of the BS.

When it is determined that the flag value is not '1' but '0', the RS proceeds to step 519. In step 519, the RS transmits data to the MS using the resource allocation scheme that it is now using.

So far, a description has been made of an example where the MS transmits data using the flag value when the BS signal affects reception of the RS signal. However, reserved bits in a particular message can be used instead of the flag value.

Figure 6:
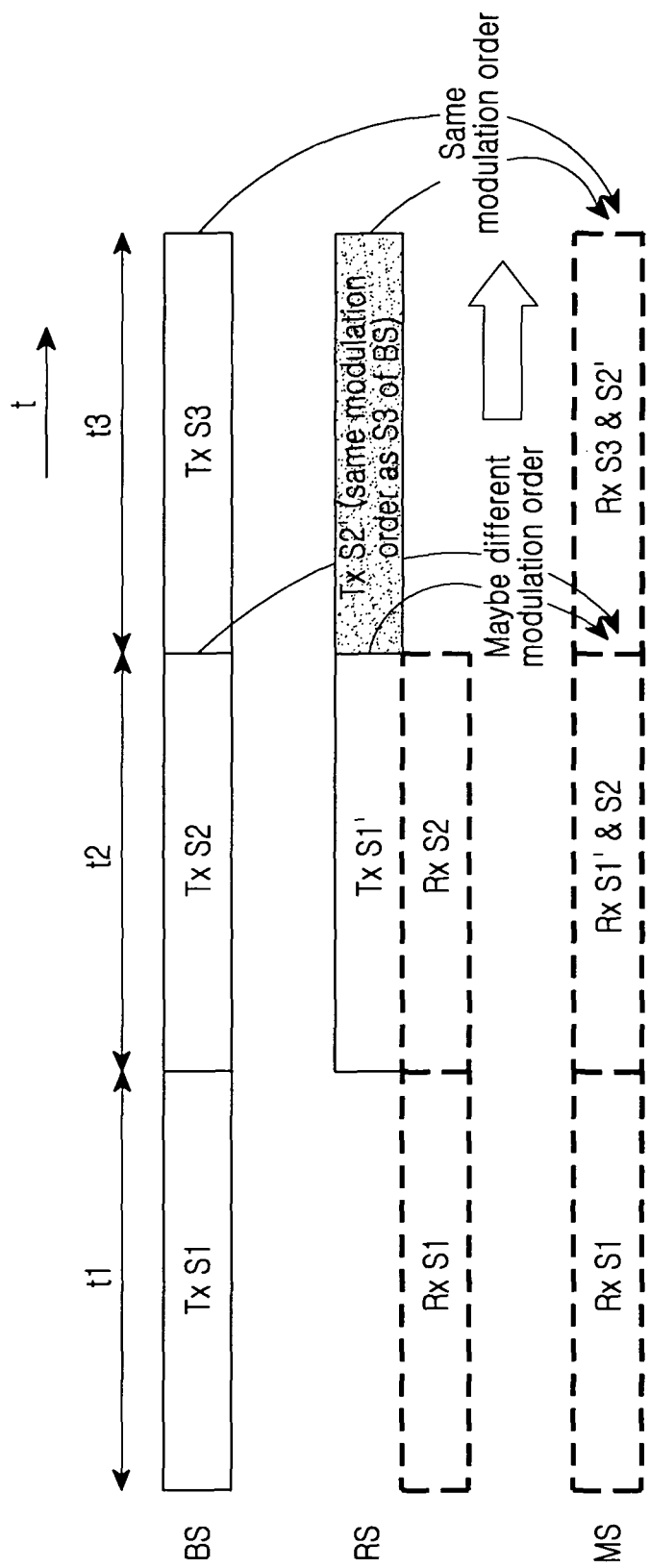
FIG. 6 illustrates a diagram for data transmission/reception periods in a relay communication system according to an embodiment of the present invention.

With reference to FIG. 6, a description will now be made of data transmission/reception periods according an embodiment of the present invention.

FIG. 6 illustrates a diagram for data transmission/reception periods in a relay communication system according to an embodiment of the present invention.

Shown in FIG. 6 are data transmission/reception periods for downlink data transmission/reception between a BS, an RS and an MS in a communication system to which the present invention is applied. In FIG. 6, solid lines indicate transmission periods, while dotted lines indicate reception periods.

The BS transmits first data S1 in a first time period t1, transmits second data S2 in a second time period t2, and transmits third data S3 in a third time period t3.

The RS receives the first data in the first time period, transmits fourth data S1' generated using the first data while receiving the second data in the second time period, and transmits fifth data S2' generated using the second data in the third time period. Though not illustrated, the RS can receive the third data in the third time period.

The MS receives the first data in the first time period, receives the second data and the fourth data in the second time period, and receives the third data and the fifth data in the third time period. When the second data is not equal to the fourth data in the resource allocation scheme, the MS may not easily remove interference. For example, when a type of interference varies from part to part in the time-frequency domain, different interference cancellation algorithms should be used for the respective parts. However, the signal from the BS is low in reliability for the MS to detect.

It is assumed that, as in the prior art, the BS and the RS use different resource allocation schemes in the second time period. In this case, the MS can receive the second data of the BS and the fourth data of the RS in the second time period. When the second data of the BS was allocated with the resource allocation scheme different from the resource allocation scheme used to transmit fourth data by the RS, the MS cannot receive the second data of the BS. In the exemplary case of FIG. 6, the resource allocation scheme is a modulation order, i.e. modulation scheme.

However, in the third time period, the RS transmits the fifth data to the MS using the same resource allocation scheme as the resource allocation scheme of the BS, on the basis of the BS's resource allocation scheme. The MS can remove all the detected data other than the fifth data or store the third data when it is for the MS, and then can combine it with sixth data S3' generated using the third data when it is received. Here, the fourth data is the first data relayed by the RS, the fifth data is the second data relayed by the RS, and the sixth data is the third data relayed by the RS.

In the present invention, for example, the RS can check the resource allocation information of the BS, but the MS cannot check the resource allocation information of the BS. Since the RS uses the same format as the resource allocation scheme of the BS, the MS can perform reception using only the resource allocation information of the RS.

In conclusion, the MS can remove or receive BS data even though it fails to receive MAP information of the BS.

As is apparent from the foregoing description, in the communication system with an RS, the MS capable of removing interference using its MIMO receiver can transmit information indicating that a BS signal acts as an interference signal, to the RS in communication with the MS, and receive RS data using the same resource allocation scheme as that of the BS. As a result, the MS can remove or utilize its received interference signal using its own interference cancellation function.

Although the present disclosure has been described with an exemplary embodiment, various changes and modifications may be suggested to one skilled in the art. It is intended that the present disclosure encompass such changes and modifications as fall within the scope of the appended claim.

What is claimed is:

1. A method for receiving data by a Mobile Station (MS) in a communication system, the method comprising:
   receiving a first Base Station (BS) signal and a first Relay Station (RS) signal;
   measuring strengths of the received first BS signal and the first RS signal;
   determining whether the first BS signal acts as interference to the first RS signal depending on the measured strengths of the first RS signal and the first BS signal;
   transmitting the determination result to an RS in communication with the MS; and
   when the first BS signal acts as interference to the first RS signal, receiving information related to a resource allocation scheme of the BS from the RS;
   receiving a second RS signal and a second BS signal using the received resource allocation scheme of the BS;
   storing the received second BS signal; and
   combining the stored second BS signal with the second RS signal received later.

2. The method of claim 1, further comprising:
   receiving the second RS signal using an existing resource allocation scheme, when the first BS signal does not act as interference to the first RS signal.

3. The method of claim 1, further comprising:
   removing the first BS signal from the first RS signal, when the first BS signal acts as interference to the first RS signal.

4. The method of claim 1, wherein the second RS signal is the second BS signal relayed by the RS.

5. The method of claim 1, wherein the information related to the resource allocation scheme comprises at least one of a modulation scheme, a coding scheme, and data allocation resource region information.

6. The method of claim 1, wherein the determination comprises:
   determining that the first BS signal acts as interference to the first RS signal, when a ratio of the strength of the first RS signal to the strength of the first BS signal is higher than or equal to a threshold; and
   determining that the first BS signal does not act as interference to the first RS signal, when the ratio of the strength of the first RS signal to the strength of the first BS signal is lower than the threshold.

7. A method for transmitting data by a Relay Station (RS) in a communication system, the method comprising:
   receiving, from a Mobile Station (MS), information as to whether a first Base Station (BS) signal acts as interference to a first RS signal;
   transmitting data to the MS using a resource allocation scheme that is different than a resource allocation scheme of the BS, when the information indicates that the first BS signal does not act as interference to the first RS signal; and
   when the information indicates that the first BS signal acts as interference to the first RS signal, detecting the resource allocation scheme of the BS used for data transmitted by the BS and relaying a second BS signal transmitted by the BS to the MS, as a second RS signal for a combination of the second RS signal with the second BS signal, using the detected resource allocation scheme.

8. The method of claim 7, wherein the detected resource allocation scheme comprises at least one of a modulation scheme, a coding scheme, and data allocation resource region information.

9. The method of claim 7, wherein the information comprises at least one of a ratio of strength of the first RS signal to strength of the first BS signal, a signal-to-interference ratio, data throughput, channel quality information (CQI), and channel capacity.

10. An apparatus configured to receive data in a communication system, the apparatus comprising:
a Mobile Station (MS) configured to:
receive a first Base Station (BS) signal and a first Relay Station (RS) signal,
measure strengths of the received first BS signal and the first RS signal,
determine whether the first BS signal acts as interference to the first RS signal depending on the measured strengths of the first RS signal and the first BS signal,
transmit the determination result to an RS in communication with the MS, and
when the BS signal acts as interference to the RS signal, receive information related to a resource allocation scheme of the BS from the RS, receive a second RS signal and a second BS signal using the received resource allocation scheme of the BS, store the received second BS signal, and combine the stored second BS signal with the second RS signal.

11. The apparatus of claim 10, wherein the MS is further configured to receive the second RS signal using an existing resource allocation scheme, when the first BS signal does not act as interference to the first RS signal.

12. The apparatus of claim 10, wherein when the first BS signal acts as interference to the first RS signal, the MS is further configured to remove the first BS signal from the first RS signal.

13. The apparatus of claim 10, wherein the second RS signal is the second BS signal relayed by the RS.

14. The apparatus of claim 10, wherein the resource allocation scheme of the BS comprises at least one of a modulation scheme, a coding scheme, and data allocation resource region information.

15. The apparatus of claim 10, wherein the MS is further configured to determine that the first BS signal acts as interference to the first RS signal when a ratio of the strength of the first RS signal to the strength of the first BS signal is higher than or equal to a threshold, and determine that the first BS signal does not act as interference to the first RS signal when the ratio of the strength of the first RS signal to the strength of the first BS signal is lower than the threshold.

16. An apparatus configured to transmit data in a communication system, the apparatus comprising:
a Relay Station (RS) configured to:
receive, from a Mobile Station (MS), information as to whether a first Base Station (BS) signal acts as interference to a first RS signal,
transmit data to the MS using a resource allocation scheme that is different than a resource allocation scheme of the BS when the information indicates that the first BS signal does not act as interference to the first RS signal, and
when the information indicates that the first BS signal acts as interference to the first RS signal, detect the resource allocation scheme of the BS used for data transmitted by the BS, and relay a second BS signal transmitted by the BS to the MS, as a second RS signal for combination of the second RS signal with the second BS signal, using the detected resource allocation scheme.

17. The apparatus of claim 16, wherein the detected resource allocation scheme of the BS comprises at least one of a modulation scheme, a coding scheme, and data allocation resource region information.

18. The apparatus of claim 16, wherein the information comprises at least one of a ratio of strength of the first RS signal to strength of the first BS signal, a signal-to-interference ratio, data throughput, channel quality information (CQI), and channel capacity.

* * * * *